United States Patent
Keränen et al.

(10) Patent No.: US 10,419,579 B2
(45) Date of Patent: Sep. 17, 2019

(54) METHODS AND DEVICES FOR SIGNALLING IN A COMMUNICATION NETWORK

(71) Applicant: Telefonaktiebolaget LM Ericsson (publ), Stockholm (SE)

(72) Inventors: Ari Keränen, Helsinki (FI); Nicklas Beijar, Kirkkonummi (FI); Anders E Eriksson, Kista (SE); Francesco Militano, Stockholm (SE); Johan Rune, Lidingö (SE); Joachim Sachs, Sollentuna (SE); Vlasios Tsiatsis, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 40 days.

(21) Appl. No.: 15/322,431

(22) PCT Filed: Jul. 10, 2014

(86) PCT No.: PCT/SE2014/050887
§ 371 (c)(1),
(2) Date: Dec. 27, 2016

(87) PCT Pub. No.: WO2016/007057
PCT Pub. Date: Jan. 14, 2016

(65) Prior Publication Data
US 2017/0134521 A1 May 11, 2017

(51) Int. Cl.
*H04L 29/08* (2006.01)
*H04W 4/70* (2018.01)
*H04L 5/00* (2006.01)

(52) U.S. Cl.
CPC ............ *H04L 67/32* (2013.01); *H04L 5/0055* (2013.01); *H04L 67/02* (2013.01); *H04W 4/70* (2018.02)

(58) Field of Classification Search
CPC ....... H04L 67/32; H04L 5/0055; H04L 67/02; H04W 4/005; H04W 4/70
See application file for complete search history.

(56) References Cited

U.S. PATENT DOCUMENTS

| 7,768,909 B1 * | 8/2010 | Parlamas ................ H04L 47/10 370/229 |
| 9,456,448 B2 * | 9/2016 | Chen .................... H04W 72/048 |

(Continued)

FOREIGN PATENT DOCUMENTS

| JP | H0561827 A | 3/1993 |
| JP | 2001111651 A | 4/2001 |

(Continued)

OTHER PUBLICATIONS

International Search Report and Written Opinion, Application PCT/SE2014/050887, dated Apr. 14, 2015, 8 pages.

(Continued)

*Primary Examiner* — Chi H Pham
*Assistant Examiner* — Weibin Huang
(74) *Attorney, Agent, or Firm* — NDWE LLP

(57) ABSTRACT

A method performed by a first node in a communication network, the first node being a first end-point of signalling with a second node in the communication network, the second node being a second end-point in said signalling. The method comprises receiving signals from the second node, said received signals comprising instructions for the first node to perform a plurality of actions as well as an indication for in which order said actions should be performed. The method also comprises performing said actions in said order. The method also comprises sending signals to the second node, said sent signals comprising an acknowledgement that the plurality of actions have been performed.

16 Claims, 3 Drawing Sheets

(56) References Cited

U.S. PATENT DOCUMENTS

| | | | | |
|---|---|---|---|---|
| 2012/0047518 | A1* | 2/2012 | Parkinson | G06Q 10/10 |
| | | | | 719/314 |
| 2012/0151028 | A1* | 6/2012 | Lu | H04W 4/18 |
| | | | | 709/223 |
| 2013/0336111 | A1* | 12/2013 | Vos | H04W 48/08 |
| | | | | 370/230 |
| 2014/0136093 | A1* | 5/2014 | Banin | G01S 5/021 |
| | | | | 701/300 |
| 2014/0376521 | A1* | 12/2014 | Wang | H04L 69/324 |
| | | | | 370/336 |
| 2015/0281196 | A1* | 10/2015 | Sharma | H04L 63/08 |
| | | | | 713/151 |
| 2016/0302022 | A1* | 10/2016 | Dence | H04W 8/18 |

FOREIGN PATENT DOCUMENTS

| | | | | |
|---|---|---|---|---|
| JP | | 2005027215 A | 1/2005 | |
| JP | | 2006277583 A | 10/2006 | |
| JP | | 2008112553 A | 5/2008 | |
| JP | | 2011150661 A | 8/2011 | |
| WO | | 2013046022 A1 | 4/2013 | |
| WO | WO | 2013071949 A1 * | 5/2013 | H04L 67/1065 |

OTHER PUBLICATIONS

Z. Shelby et al., "Constrained Application Protocol (CoAP) draft-ieff-core-coap-18," Jun. 28, 2013, 118 pages, CoRE Working Group, Internet-Draft, IETF Trust and the persons identified as the document authors.

A. Rahman et al., "Group Communication for CoAP draft-ieff-core-groupcomm-16," Oct. 2, 2013, 41 pages, CoRE Working Group, Internet-Draft, IETF Trust and the persons identified as the document authors.

IEEE Std 802.15.4™-2015, "IEEE Standard for Low-Rate Wireless Networks," LAN/MAN Standards Committee of the IEEE Computer Society, (Revision of IEEE Std 802.15.4-2011), Dec. 5, 2015, 708 pages.

International Preliminary Report on Patentability for Application No. PCT/SE2014/050887, dated Jan. 19, 2017, 7 pages.

Notification of Reasons for Refusal from foreign counterpart Japanese Patent Application No. 2017-500927, dated Mar. 14, 2018, 7 pages.

Decision to Grant a Patent from foreign counterpart Japanese Patent Application No. 2017-500927, dated Oct. 16, 2018, 6 pages.

Communication pursuant to Article 94(3) EPC for European Application No. EP14747163.5, dated Jan. 17, 2019, 5 pages.

First Office Action from foreign counterpart Indian Patent Application No. 201747000613, dated Mar. 8, 2019, 6 pages.

* cited by examiner

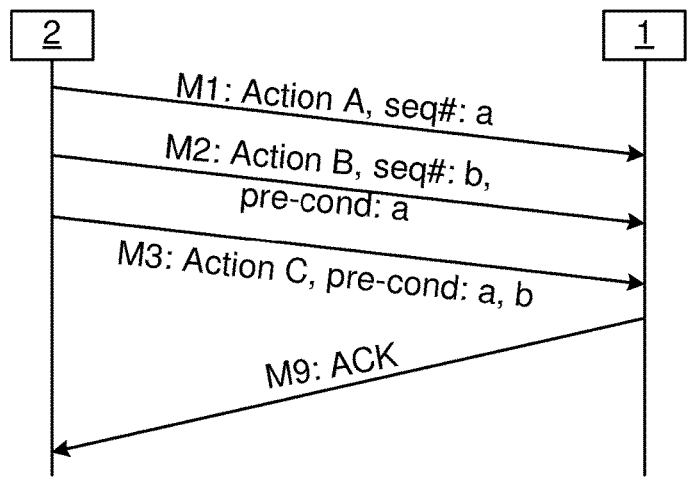
Fig. 4
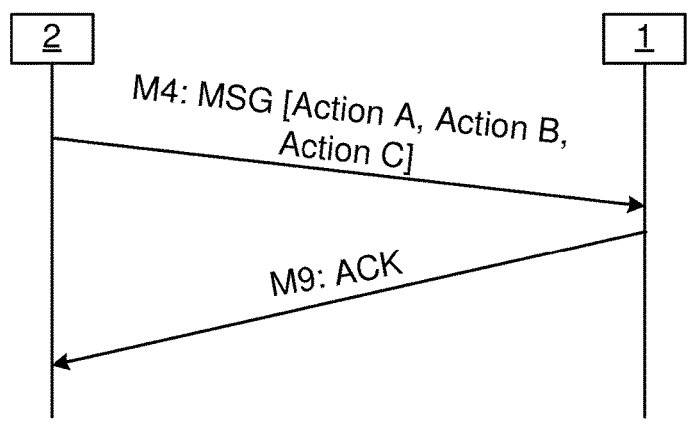
Fig. 5
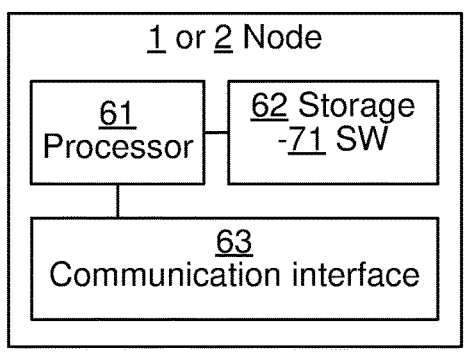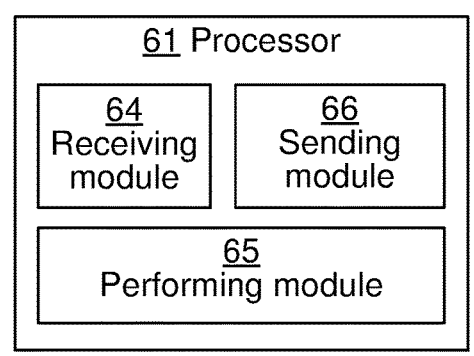
Fig. 6a　　　　　　　　　　　Fig. 6b

METHODS AND DEVICES FOR SIGNALLING IN A COMMUNICATION NETWORK

CROSS-REFERENCE TO RELATED APPLICATIONS

This application is a National stage of International Application No. PCT/SE2014/050887, filed Jul. 10, 2014, which is hereby incorporated by reference.

TECHNICAL FIELD

The present disclosure relates to a method performed by a node in a communication network for sending or receiving instructions to/from a second node in said network for performing a plurality of actions.

BACKGROUND

The Constrained Application Protocol (CoAP) is a web transfer protocol targeted for constrained connected devices and networks. Such devices may need to be involved in multiple transactions, for which a certain order of processing/execution is needed. One example is:

1) A node requests a sensor reading from a machine device (MD)
2) Based on received information about the reading, the node transmits a sensor configuration to the MD, e.g. to specify which measurement configuration is to be used for the next (or a particular type of) sensor reading. Possibly this step includes also another action (e.g. heat up probe X, add water).
3) The node requests a new sensor reading from the MD according to the new configuration (and after the actions).

The sequence of the execution is determined by the order of how CoAP transactions are communicated and making transactions sequential. So first transaction 1) in the above example is transmitted. Only after the response to the first transaction has been received by the node (i.e. when the transaction is finished) the next transaction 2) is initiated and so forth.

The CoAP protocol supports acknowledged transactions that can be used to confirm that a transaction was successfully received and acted upon in order to achieve proper ordering of actions, as shown in FIG. 1 where a transmitted first Action is followed by an acknowledgement before the second Action is transmitted etc.

In many use cases, MDs are running on short-range radio technologies and have battery-saving sleep modes so the MD itself or other nodes on the transmission paths are sleeping during certain times. In this case transaction messages are either buffered in the network until the end of the sleep period, or they are retransmitted after a timeout. For sleepy devices, sequential communication of multiple transactions, where one waits for the acknowledgement of the previous transaction before sending the next one, can take long time and are often not efficient, since data cannot be transmitted entirely when a device wakes up, but it is sent in multiple occasions spread in time.

The basic acknowledgement solution shown in FIG. 1 requires waiting for an acknowledgement message before the next action can be sent. If the network has long round-trip times (e.g. due to nodes on the transmission path sleeping and hence requiring storing the message in the network while waiting for the nodes to wake up), this will result in a long delay before all transactions are completed, and/or requires nodes to stay awake for a longer time in order to transmit all messages of a sequence.

SUMMARY

It is an objective of the present disclosure to provide a more effective way of transmitting sequential messages, comprising instructions for performing actions which should be performed sequentially, between nodes in a communication network.

According to an aspect of the present disclosure, there is provided a method performed by a first node in a communication network. The first node is a first end-point of signalling with a second node in the communication network. The second node is a second end-point in said signalling. The method comprises receiving signals from the second node, said received signals comprising instructions for the first node to perform a plurality of actions as well as an indication for in which order said actions should be performed. The method also comprises performing said actions in said order. The method also comprises sending signals to the second node, said sent signals comprising an acknowledgement that the plurality of actions have been performed.

According to another aspect of the present disclosure, there is provided a first node for a communication network and configured for being a first end-point in signalling with a second node in the communication network, the second node being a second end-point in said signalling. The first node comprises processor circuitry, and a storage unit storing instructions executable by said processor circuitry whereby said first node is operative to receive signals from the second node, said received signals comprising instructions for the first node to perform a plurality of actions as well as an indication for in which order said actions should be performed. The first node is also operative to perform said actions in said order. The first node is also operative to send signals to the second node, said sent signals comprising an acknowledgement that the plurality of actions have been performed.

According to another aspect of the present disclosure, there is provided a method performed in a second node in a communication network, the second node being a second end-point of signalling with a first node in the communication network, the first node being a first end-point in said signalling. The method comprises sending signals to the first node, said sent signals comprising instructions for the first node to perform a plurality of actions as well as an indication for in which order said actions should be performed. The method also comprises receiving signals from the first node, said received signals comprising an acknowledgement that the plurality of actions have been performed.

According to another aspect of the present disclosure, there is provided a second node for a communication network and configured for being a second end-point of signalling with a first node in the communication network, the first node being a first end-point in said signalling. The second node comprises processor circuitry, and a storage unit storing instructions executable by said processor circuitry whereby said second node is operative to send signals to the first node, said sent signals comprising instructions for the first node to perform a plurality of actions as well as an indication for in which order said actions should be performed. The second node is also operative to receive signals from the first node, said received signals comprising an acknowledgement that the plurality of actions have been performed.

According to another aspect of the present disclosure, there is provided a computer program product comprising computer-executable components for causing a node in a communication network to perform an embodiment of a method of the present disclosure when the computer-executable components are run on processor circuitry comprised in the node.

According to another aspect of the present disclosure, there is provided a computer program comprising computer program code which is able to, when run on processor circuitry of a first node in a communication network, the first node being a first end-point of signalling with a second node in the communication network, the second node being a second end-point in said signalling, cause the first node to receive signals from the second node, said received signals comprising instructions for the first node to perform a plurality of actions as well as an indication for in which order said actions should be performed. The code is also able to cause the first node to perform said actions in said order. The code is also able to cause the first node to send signals to the second node, said sent signals comprising an acknowledgement that the plurality of actions have been performed.

According to another aspect of the present disclosure, there is provided a computer program comprising computer program code which is able to, when run on processor circuitry of a second node in a communication network, the second node being a second end-point of signalling with a first node in the communication network, the first node being a first end-point in said signalling, cause the second node to send signals to the first node, said sent signals comprising instructions for the first node to perform a plurality of actions as well as an indication for in which order said actions should be performed. The code is also able to cause the second node to receive signals from the first node, said received signals comprising an acknowledgement that the plurality of actions have been performed.

According to another aspect of the present disclosure, there is provided a computer program product comprising an embodiment of a computer program of the present disclosure and a computer readable means on which the computer program is stored.

By including an indication for in which order a plurality of actions should be performed, embodiments of the present disclosure enables the use of a single acknowledgement for confirming that all of the actions have been performed. The second node will then know that the actions are performed in the intended order, regardless of e.g. the order in which the instructions for performing the actions are received by the first node (e.g. if some instructions are delayed during transmission). Less signalling is thus required and the signalling may take less time since the second node will not have to wait for an acknowledgement confirming that one action has been performed before sending instructions to perform another action.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 4 is a schematic signalling diagram illustrating some embodiments of the present disclosure.

FIG. 5 is a schematic signalling diagram illustrating some other embodiments of the present disclosure.

FIG. 6a is a schematic block diagram of an embodiment of a network node of the present disclosure.

FIG. 6b is a schematic block diagram of an embodiment of processor circuitry of a network node of the present disclosure.

DETAILED DESCRIPTION

Embodiments will now be described more fully hereinafter with reference to the accompanying drawings, in which certain embodiments are shown.

However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
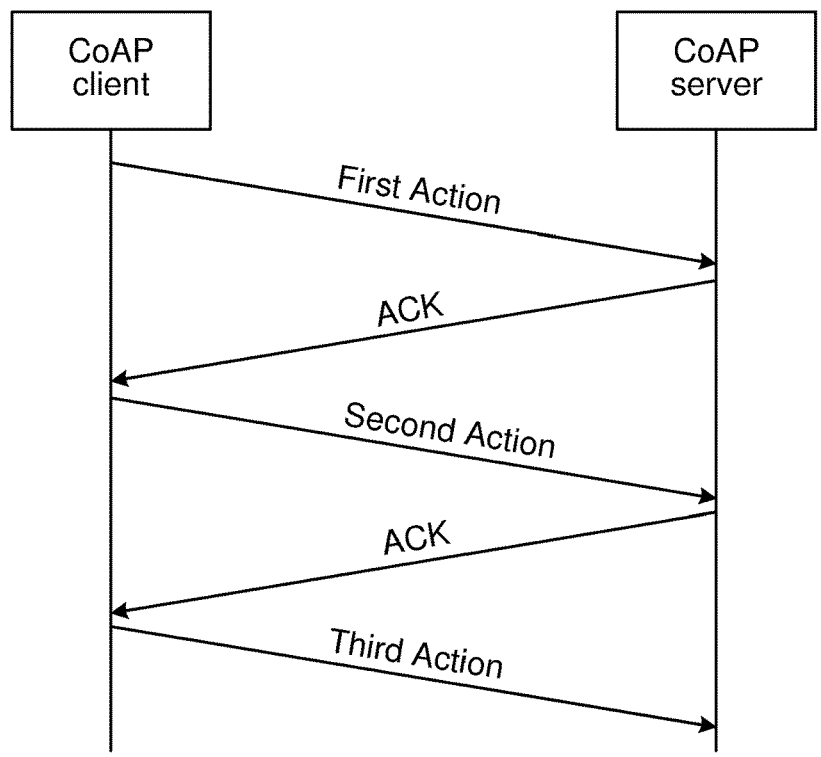
FIG. 1 is a schematic signalling diagram illustrating signalling between two CoAP nodes in accordance with prior art.
Figure 2:
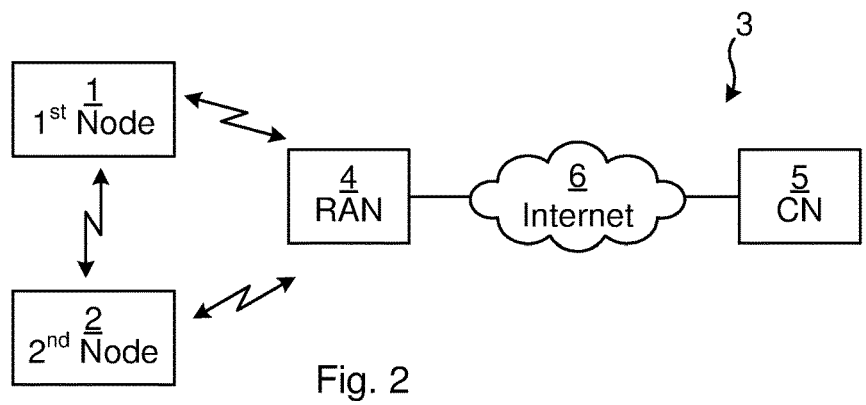
FIG. 2 is a schematic block diagram of an embodiment of a communication network in accordance with the present disclosure.

FIG. 2 schematically illustrates an embodiment of a communication network 3 in accordance with the present disclosure. In this embodiment, the communication network 3 is a cellular radio communication network comprising a radio access network (RAN) 4 connected to a core network (CN) 5 via a public data network (PDN) 6 e.g. the Internet. In the embodiment of FIG. 2, both the first node 1 and the second node 2 are radio devices which are served by the RAN 4. Alternatively, at least one of the nodes 1 and 2 may be wiredly or wirelessly connected via e.g. the internet 6 in the communication network 3. The first and second nodes 1 and 2 are able to communicate with each other by means of a radio interface comprised in the respective node, either directly over the air interface between the two nodes or via the RAN 4 (and possibly also via the Internet 6) as indicated by the double-headed arrows in FIG. 2. The first and second nodes 1 and 2 may also be able to communicate to the Internet via a gateway node, to which they communicate with using a short-range radio (e.g., in accordance with Bluetooth, Wi-Fi, or Institute of Electrical and Electronics Engineers (IEEE) standard 802.15.4). The gateway node may be connected to the Internet via wire or wirelessly.

Figure 3:
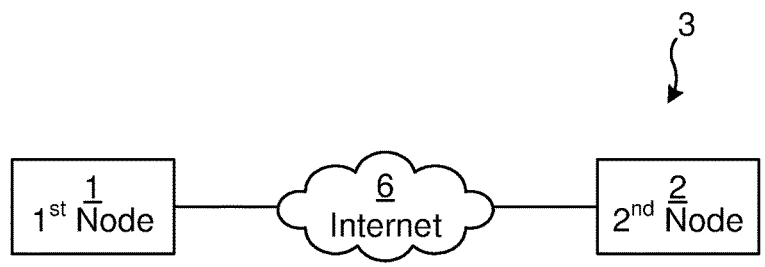
FIG. 3 is a schematic block diagram of another embodiment of a communication network in accordance with the present disclosure.

FIG. 3 schematically illustrates another embodiment of a communication network 3 in accordance with the present disclosure. In this embodiment, the communication network 3 is a wired network where the first node 1 and the second node 2 are communicating with each other via wired connections, e.g. directly or via the PDN/Internet 6.

The embodiments of the communication network 3 illustrated by FIGS. 2 and 3 are only a couple of examples. The communication network may be any communication network, comprising any number of nodes in addition to the first and second nodes 1 and 2, wired or wireless, and in accordance with any one or combination of communication standard(s). If at least one of the first and second nodes 1 and 2 is a radio device, it may be configured to communicate over its radio interface e.g. in accordance with a wireless local area network (WLAN), Bluetooth, or cellular (e.g. Third Generation Partnership Project, 3GPP) communication standard.

FIG. 4 is a schematic signalling diagram illustrating some embodiments of the present disclosure. In the embodiments of FIG. 4, the second node 2 sends a plurality of messages M1, M2 and M3 which are received by the first node 1. Each of the messages comprises instructions for at least one action A, B and C, respectively. At least one, or at least some, of the messages M1, M2 and M3 also comprises a transaction identifier, here the sequence numbers a and b forming part of the indication for in which order said actions should be performed. Thanks to the transaction identifiers, the second node 2 may rely on the first node 1 performing the actions in the intended order and it is enough that a single acknowledgement message M9 is sent by the first node 1 and received by the second node 2 for informing the second node 2 that all the actions A, B and C have been performed. More specifically, the second node 2 sends a first message M1 to the first node 1. The first message M1 comprises instructions for the first node 1 to perform action A, as well as a transaction identifier in the form of a sequence number a. The second node 2 also sends a second message M2 to the first node 1. The second message is typically sent after the first message M1, but thanks to the transaction identifiers this is not necessary and the second message may very well be sent at the same time or before the first message. Regardless of the order in which the first and second messages are sent, this order may have changed when they are received by the first node 1 e.g. due to congestion or other delays. The second message M2 comprises instructions for the first node 1 to perform action B, as well as a transaction identifier in the form of a sequence number b. The second message M2 also comprises conditional instructions in the form of a pre-condition stating that action B should be performed after the action A associated with the sequence number a. Similarly, the second node 2 also sends a third message M3 to the first node 1. The third message M3 comprises instructions for the first node 1 to perform action C, as well as a pre-condition stating that action C should be performed after the actions A and B associated with the sequence numbers a and b have been performed. Since action C is the last action to be performed in this sequence of the plurality of actions, the third message M3 does not necessarily have to comprise a sequence number, but may do so. After the first node 1 has performed all the actions A, B and C in the intended order in accordance with the transaction identifiers and conditional instructions, it send the acknowledgement message M9 to the second node 2.

Thus, in some embodiments of the present disclosure, the step of receiving signals comprises receiving a plurality of messages M1, M2 and M3, each message comprising instructions for at least one action as well as a transaction identifier a and b forming part of the indication for in which order said actions should be performed. In some embodiments, the transaction identifiers are sequential numbers, and wherein the order is such that each of the plurality of actions should be performed sequentially in accordance with the corresponding sequential number comprised in the message comprising the instructions for the action. In some other embodiments, at least one, or at least some, of the messages M1, M2 and M3 comprises conditional instructions for performing an action after another action has been performed, said another action being identified in said at least one of the messages by the transaction identifier of the message in which the instructions for performing said another action was received. Then, the transaction identifiers may be opaque, e.g. random numbers or other strings of characters, since indication of the order is based on the conditional instructions and not only on the transaction identifiers.

FIG. 5 is a schematic signalling diagram illustrating some other embodiments of the present disclosure. In the embodiments of FIG. 5, the first node receives the instructions to perform the plurality of actions A, B and C are received in a single message M4. In this case, the instructions for in which order said actions should be performed may e.g. be formed by the order of the action information in the message M4. If e.g. the instructions about action A is before the instructions about action B in the message M4, which in its turn is before the instructions about action C in the message M4, then the first node may interpret this as instructions that the actions should be performed in the order of first performing action A, then action B and last action C. In other embodiments, the message M4 may include transaction identifiers (herein also called action identifiers, to distinguish them from the transaction identifiers associated with a message rather than with an action) and/or conditional instructions as discussed in relation to FIG. 4, associated with the actions A, B and C. The actions may, in the message M4, e.g. be associated with sequence numbers and/or pre-conditions which form instructions for in which order the first node 1 should perform the actions. In some embodiments, the message M4 may itself be associated with a transaction identifier and/or conditional instructions as discussed herein, e.g. if a plurality of messages M4, each comprising instructions for a plurality of actions, are sent to the first node 1. A combination of the embodiments of FIGS. 4 and 5 may then be used where a plurality of messages M4, each comprising instructions for a plurality of actions, are sent to the first node 1, wherein the first node 1 may send an acknowledgment message M9 confirming that it has performed all of the actions comprised in the plurality of messages M4. The message M4 may be a new type of message which, typically in its header, indicates that it comprises instructions for more than one action, i.e. for performing a plurality of actions. The header may e.g. comprise a content format indication, e.g. a new CoAP content format, indicating that said message comprises instructions for a plurality of actions.

To use a single message M4 may be preferable to using a plurality of messages M1, M2 and M3, in order to reduce signalling, especially if the message M4 may be kept small enough to avoid fragmentation thereof when the message is transmitted from the second node 2 to the first node 1. If the message is fragmented, and even one fragment is lost, the whole message is lost and usually all fragments need to be retransmitted resulting in high overhead for communication. Therefore fragmentation is generally avoided, especially in networks with high packet loss. Thus, the message M4 preferably has a size which is small enough to fit into a single data frame when transmitted, e.g. at the most 127 bytes in accordance with the 802.15.4 communication standard of IEEE, or at the most 102 bytes with Internet Protocol version 6, IPv6, (6LoWPAN) over the 802.15.4 IEEE standard. After the first node 1 has performed all the actions A, B and C in the intended order, it send the acknowledgement message M9 to the second node 2, as also discussed in relation to FIG. 4.

Thus, in some embodiments of the present disclosure, the instructions for the first node 1 to perform a plurality of actions A, B and C as well as the indication for in which order said actions should be performed are received in a single message M4 comprised in (e.g. constituting) the signals received by the first node 1. In some embodiments, said received single message M4 comprises, in its header, a content format indication indicating that said message comprises instructions for a plurality of actions. In some embodiments, the received single message M4 has a size which fits into a single data frame, e.g. at the most 100 bytes. In some embodiments, the received single message M4 comprises a transaction identifier indicating to the first node in which order it should perform the plurality of actions A, B and C in relation to actions of an additional received message M4. In some embodiments, each action, or at least one or some of the actions, for which instructions are received is associated with a respective action identifier in the received single message M4.

In some embodiments of the present disclosure, both relating to FIG. 4 and FIG. 5, the acknowledgement that the plurality of actions A, B and C have been performed is sent in a single acknowledgement message M9. This is made possible by the present disclosure since a single acknowledgment for a plurality of actions may be, or be comprised in, the sent signals to the second node 2, and reduces the signalling overhead of the communication network 3. The acknowledgement M9 that the plurality of actions have been performed may be generated in the first node 1 based on application logic and message semantics of the received signals M1, M2 and M3 and/or M4, e.g. in the application layer in the first node. The acknowledgement message M9 may thus not be a simple acknowledgment of a received communication since the acknowledgment also confirms that the actions have actually been performed. The acknowledgement message M9 may instead be initiated in the application layer (or other higher layer) of the first node 1.

FIG. 6a is a schematic block diagram of an embodiment of a network node, such as the first node 1 and/or the second node 2 discussed herein. In some embodiments of the present disclosure, the first node 1 is a constrained Machine Type Communication Device (MD) in accordance with 3GPP terminology. Conveniently, especially if the first node 1 is an MD, the signalling with the second node 2 is in accordance with a Constrained Application Protocol (CoAP). Alternatively, the signalling with the second node 2 may be in accordance with a Hypertext Transfer Protocol (HTTP) which is another example of a communication protocol with which embodiments of the present disclosure may be beneficial. The node 1 or 2 comprises processor circuitry 61 e.g. a central processing unit (CPU). The processor circuitry 61 may comprise one or a plurality of processing units in the form of microprocessor(s). However, other suitable devices with computing capabilities could be comprised in the processor circuitry 61, e.g. an application specific integrated circuit (ASIC), a field programmable gate array (FPGA) or a complex programmable logic device (CPLD). The processor circuitry 61 is configured to run one or several computer program(s) or software (SW) 71 (see also FIG. 7) stored in a storage 62 of one or several storage unit(s) e.g. a memory. The storage unit is regarded as a computer readable means 72 (FIG. 7) as discussed herein and may e.g. be in the form of a Random Access Memory (RAM), a Flash memory or other solid state memory, or a hard disk, or be a combination thereof. The processor circuitry 61 may also be configured to store data in the storage 62, as needed. The node 1 or 2 also comprises a communication interface 63 comprising a transmitter and a receiver, typically combined to a transceiver, for sending and receiving messages to/from other elements of the communication network 3, e.g. the other node 1 or 2 as in accordance with the embodiments of the present disclosure. The node 1 or 2 may be configured for wired and/or wireless communication. In case of wireless communication, the communication interface 63 may be a radio interface. Thus, the first node 1 may be a radio device, whereby the received signals M1, M2 and M3 and/or M4 may be received S1, and the sent signals M9 may be sent, by means of a radio interface.

Thus, there is provided a first node 1 for a communication network 3 and configured for being a first end-point in signalling with a second node 2 in the communication network, the second node being a second end-point in said signalling. The first node comprises processor circuitry 61, and a storage unit 62 storing instructions 71 executable by said processor circuitry 61 whereby said first node 1 is operative to receive S1 signals from the second node 2, said received signals comprising instructions for the first node 1 to perform a plurality of actions A, B and C as well as an indication for in which order said actions should be performed. The first node 1 is also operative to perform S2 said actions A, B and C in said order. The first node 1 is also operative to send S3 signals to the second node 2, said sent signals comprising an acknowledgement that the plurality of actions have been performed.

Similarly, there is provided a second node 2 for a communication network 3 and configured for being a second end-point of signalling with a first node 1 in the communication network. The first node is a first end-point in said signalling. The second node comprises processor circuitry 61, and a storage unit 62 storing instructions 71 executable by said processor circuitry 61 whereby said second node 2 is operative to send S11 signals to the first node 1, said sent signals comprising instructions for the first node to perform a plurality of actions A, B and C as well as an indication for in which order said actions should be performed. The second node 2 is also operative to receive S12 signals from the first node 1, said received signals comprising an acknowledgement M9 that the plurality of actions A, B and C have been performed.

FIG. 6b is a schematic block diagram illustrating an embodiment of the processor circuitry 61 of FIG. 6a. As previously mentioned, the processor circuitry 61 may run software 71 for enabling the first node 1 or the second node 2 to perform an embodiment of a method of the present disclosure, whereby functional modules may be formed in the processor circuitry for performing the different steps of the method. These modules are schematically illustrated as blocks within the processor circuitry 61 in FIG. 6b. Thus, the processor circuitry 61 of the first node 1 comprises a receiving module 64 for, typically in cooperation with the communication interface 63, receiving the signals M1, M2 and M3 and/or M4 from the second node 2. The processor circuitry 61 also comprises a performing module 65 for performing the actions A, B and C in the correct order. Also, the processor circuitry 61 comprises a sending module 66 for, typically in cooperation with the communication interface 63, sending the signals comprising the acknowledgement message M9. Similarly, the processing circuitry 61 of the second node 2 comprises a sending module 66 for sending, typically in cooperation with the communication interface 63, the signals M1, M2 and M3 and/or M4 to the first node 1. Also, the processing circuitry 61 of the second node 2 comprises a receiving module 64 for receiving, typically in cooperation with the communication interface 63, the signals comprising the acknowledgement message M9.

Figure 7:
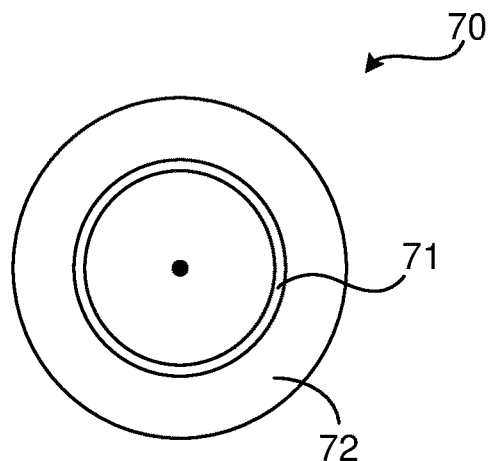
FIG. 7 is a schematic illustration of an embodiment of a computer program product of the present disclosure.

FIG. 7 illustrates a computer program product 70. The computer program product 70 comprises a computer readable medium 72 comprising a computer program 71 in the form of computer-executable components 71. The computer program/computer-executable components 71 may be configured to cause a first node 1 or a second node 2, e.g. as discussed herein, to perform an embodiment of a method of the present disclosure. The computer program/computer-executable components may be run on the processor circuitry 61 of the node 1 or 2 for causing the node to perform the method. The computer program product 70 may e.g. be comprised in a storage unit or memory 62 comprised in the node 1 or 2 and associated with the processor circuitry 61. Alternatively, the computer program product 70 may be, or be part of, a separate, e.g. mobile, storage means, such as a computer readable disc, e.g. CD or DVD or hard disc/drive, or a solid state storage medium, e.g. a RAM or Flash memory.

Figure 8:
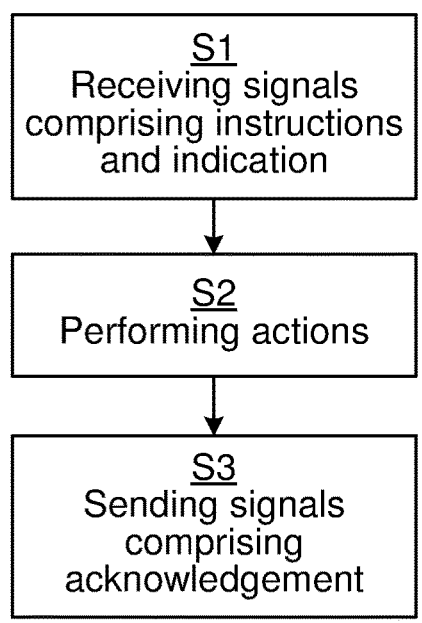
FIG. 8 is a schematic flow chart of an embodiment of a method of the present disclosure.

FIG. 8 is a schematic flow chart of an embodiment of a method performed by the first node 1 in accordance with the present disclosure. The method is performed by the first node 1 in a communication network 3. The first node is a first end-point of signalling with a second node 2 in the communication network 3. The second node is a second end-point in said signalling. This implies that the messages of said signalling between the first and second nodes 1 and 2 are addressed, e.g. by means of an internet protocol (IP) address, to the respective node 1 or 2 by the other of the two nodes. The first node 1 receives S1 signals M1, M2 and M3 and/or M4 from the second node 2. The received signals comprises instructions for the first node 1 to perform a plurality of actions A, B and C as well as an indication for in which order said actions should be performed. In response to the received S1 signals, the first node 1 performs S2 said actions in said order. After the actions A, B and C have been performed S2, the first node 1 sends S3 signals to the second node 2. The sent signals comprises an acknowledgement M9 that the plurality of actions have been performed.

Figure 9:
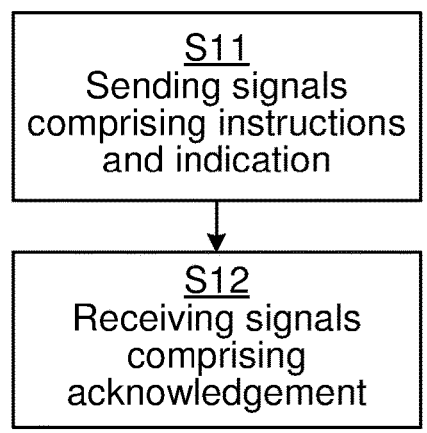
FIG. 9 is a schematic flow chart of another embodiment of a method of the present disclosure.

FIG. 9 is a schematic flow chart of an embodiment of a method performed by the second node 2 in accordance with the present disclosure. The method is performed by the second node 2 in a communication network 3. The second node is a second end-point of signalling with a first node 1 in the communication network 3. The first node is a first end-point in said signalling. The second node 2 sends S11 signals to the first node 1. The sent signals comprises instructions for the first node to perform a plurality of actions A, B and C as well as an indication for in which order said actions should be performed. Then, the second node 2 receives S12 signals from the first node 1. The received signals comprises an acknowledgement M9 that the plurality of actions have been performed by the first node 1.

An objective of some embodiments of the present disclosure is to parallelize transmission of multiple CoAP transactions such as M1-M4 and M9 between the first and second nodes 1 and 2, so that they can be communicated simultaneously. This reduces significantly the delay of a sequence of transactions, and also transmission resources (e.g. on the radio interface scheduling) may be more efficiently used. However, this has the risk that the sequence of execution intended by the series of transactions is violated in the execution. In the examples given in FIG. 4, all request messages M1, M2 and M3 may be transmitted essentially at the same time, but we assume message M2 is lost in the transmission. The first node 1 (e.g. an MD) executes the actions of messages M1 and M3 then and transmits the corresponding response M9. Wrongly, the second e.g. meter reading of action C is now being made with the wrong configuration if the action B of M2 was to change the configuration, leading to an incorrect reading. In a next step action B of message M2 is retransmitted and when received at the first node 1, it will reconfigure the node 1. Alternatively, the action of M3 is never executed since it depends on the action of M2, which has been lost.

Embodiments of the present disclosure enables more effective communication for e.g. Internet of Things (IoT) scenarios by enabling sequential execution of actions A, B and C that are sent in parallel.

Embodiments of the present disclosure also enables ordered transactions in multicast environments. When multicasting is used, each receiver sending an acknowledgement messages M9 does not scale. Hence only un-acknowledged CoAP multicast messages are allowed. However, with the pre-conditions extension and first node 1 (e.g. an MD) receiving S1 a multicast message M2, the first node 1 can detect if it has missed an earlier message M1, communicate this to the second node 2, and recover from this error situation.

In accordance with the present disclosure, there are given (as examples) two ways to achieve ordered execution of the actions A, B and C, sequence numbers a and b and transaction packing in a single message M4.

By adding a sequence order into the transactions, the first node 1 may learn during a transaction if a particular action resulting from a transaction can be immediately executed, or if it has to be deferred until the execution resulting of a number of other transactions first need to be made, by means of including the conditional information, e.g. pre-conditions, discussed herein.

Thus, the sequencing can be provided by including execution/processing conditions into the transactions, e.g. messages M1-M3. The conditions may comprise e.g. which transactions need to be processed first (i.e. pre-conditions). An indication of the corresponding transaction identifier on which conditions occur can accordingly be added into the transactions.

It is noted that transaction identifiers (e.g. numbers) need not be incremental/sequential but may be randomized to avoid e.g. security problems. Still, the order of transaction identifiers may be known and be shared among communicating nodes 1 and 2 (e.g. a set of "next transaction identifier(s)" may be embedded in a message M1-M3). If those are not shared, the first node 1 may simply wait until a transaction (comprising instructions for an action) happens for which a condition has been received earlier.

With transaction packing, multiple transactions are packed into a single message M4 and the first node 1 may e.g. have to execute all the actions in the order that they appear in the message.

Example 1—Sequence Numbers Method
(cf. FIG. 4)

When sequence numbers are used, CoAP client of the second node 2 sends S11, to the first node 1, e.g. an MD acting as a CoAP server, a CoAP message M1 that includes a new extension header called "sequence number". When the first node 1 receives S1 the message M1, it performs S2 the desired action and stores the sequence number. When the second node 2 sends S11 a message M2 whose action B depends on the first message M1 (or a set of messages), it adds another extension header called "pre-condition" to the CoAP message M2. In this extension the second node 2 lists all the sequence numbers a on which this message M2 depends. When the first node 1 receives S1 the second message M2 with the pre-conditions extension, it checks all sequence numbers a listed in the pre-conditions and performs S2 the action B only if it has previously executed the action A matching the listed sequence number(s) a.

If the first node 1 has not received the message M1 and hence performed the action(s) A required by the pre-condition, it may have two options: caching or discarding the new message M2. If the order of messages was changed during transit, it is likely that the message(s) M1 required by the pre-condition will in arrive shortly and all actions A and B can be executed in order, and hence it may make sense to cache the message M2. However, caching messages requires storage (memory) of the first node 1 (e.g. an MD) and may be possible only in a limited amount of cases. If the first node 1 is unable to cache the message M2 with pre-condition of a, it may respond to the second node 2 with an error message containing (at least some of) the sequence numbers a for which it has not performed actions yet. Based on this information, the second node 2 can retransmit the missing message M1 or take any other suitable course of actions.

In order to limit the amount of sequence numbers a, b an MD needs to remember, the messages with sequence numbers for preconditions may contain a timeout value that contains the amount of time after which the MD can discard the sequence number if no message with matching pre-conditions has arrived.

The sequence numbers may be stored either as a simple list, or, if false positives are tolerated, the sequence numbers may be stored and transmitted more efficiently e.g. using Bloom filters.

Example 2—Transaction Packing Method
(cf. FIG. 5)

If transaction packing is used, one CoAP message M4 may act as an envelope for a set of CoAP messages, corresponding to the messages M1-M3. A new CoAP content-format may be used to indicate that a CoAP message M4 contains multiple CoAP messages that are supposed to be handled in the order they appear in the envelope message M4.

This method may be more effective than sending multiple messages M1-M3 with sequence numbers a and b since it (potentially) requires only a single message M4 and hence incurs the overhead of lower layers of the nodes 1 and 2 only once and doesn't require the additional new extension headers for transaction identifiers and conditional information. However, CoAP messages are commonly sent over networks that have hard constraints on the size of a message and if that size is exceeded, the message is fragmented. If one of the fragments is lost, the whole message is usually lost and hence fragmentation is undesirable. Also a constrained MD may not be able to reassembly a very large message even if it could handle all contained messages individually. Hence, which method of example 1 or example 2 is more efficient may depend on the characteristics of the network 3 and the nodes 1 and 2 involved.

Below follow some other aspects of the present disclosure.

According to an aspect of the present disclosure, there is provided a first node 1 for a communication network 3 and configured for being a first end-point in signalling with a second node 2 in the communication network, in which case the second node is a second end-point in said signalling. The first node comprises means (e.g. the receiving module 64, typically in cooperation with the communication interface 63) for receiving S1 signals M1, M2 and M3 and/or M4 from the second node 2, said received signals comprising instructions for the first node 1 to perform a plurality of actions A, B and C as well as an indication for in which order said actions should be performed.

The first node also comprises means (e.g. the performing module 65) for performing S2 said actions A, B and C in said order. The first node 1 also comprises means (e.g. the sending module 66, typically in cooperation with the communication interface 63) for sending S3 signals to the second node 2, said sent signals comprising an acknowledgement M9 that the plurality of actions A, B and C have been performed.

According to another aspect of the present disclosure, there is provided a second node 2 for a communication network 3 and configured for being a second end-point of signalling with a first node 1 in the communication network, in which case the first node 1 is a first end-point in said signalling. The second node 2 comprises means (e.g. the sending module 66, typically in cooperation with the communication interface 63) for sending S11 signals to the first node 1, said sent signals comprising instructions for the first node to perform a plurality of actions A, B and C as well as an indication for in which order said actions should be performed. The second node 2 also comprises means (e.g. the receiving module 64, typically in cooperation with the communication interface 63) for receiving S12 signals from the first node 1, said received signals comprising an acknowledgement M9 that the plurality of actions A, B and C have been performed.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a first node in a communication network, the first node being a first end-point of signalling with a second node in the communication network, the second node being a second end-point in said signalling, the method comprising:
   receiving a message from the second node, the message comprising, in a header, a content format indication indicating that the message contains instructions for the first node to perform a plurality of actions, wherein the instructions indicate in which order to perform the plurality of actions;
   performing the plurality of actions in the order indicated; and
   sending an acknowledgement signal, comprising an acknowledgement that the plurality of actions have been performed, to the second node, in response to performing the plurality of actions.

2. The method of claim 1, wherein the acknowledgement signal is sent in a single acknowledgement message.

3. The method of claim 1, wherein the acknowledgement that the plurality of actions have been performed is generated in an application layer in the first node.

4. The method of claim 1, wherein the message is an envelope for a plurality of Constrained Application Protocol (CoAP) messages containing the instructions.

5. The method of claim 1, wherein the content format indication is a Constrained Application Protocol (CoAP) content format indication.

6. The method of claim 1, wherein the message has a size which fits into a single data frame having at most 127 bytes.

7. The method of claim 1, wherein the message has a size which fits into a single data frame having at most 100 bytes.

8. The method of claim 1, wherein each action for which instructions are received is associated with a respective action identifier in the message.

9. The method of claim 1, wherein the first node is a constrained Machine Type Communication Device (MD).

10. The method of claim 1, wherein the first node is a radio device and wherein the message is received and the acknowledgement signal sent, by means of a radio interface.

11. The method of claim 1, wherein the signalling with the second node is in accordance with a Constrained Application Protocol (CoAP) or Hypertext Transfer Protocol (HTTP).

12. A first node for a communication network and configured for being a first end-point in signalling with a second node in the communication network, the second node being a second end-point in said signalling, the first node comprising:
processor circuitry; and
a storage unit storing instructions executable by said processor circuitry, wherein the first node is operative to:
receive a message from the second node, the message comprising, in a header, a content format indication indicating that the message contains instructions for the first node to perform a plurality of actions, wherein the instructions indicate in which order to perform the plurality of actions;
perform the plurality of actions in the order indicated; and
send an acknowledgement signal, comprising an acknowledgement that the plurality of actions have been performed, to the second node, in response to performing the plurality of action.

13. A method performed by a second node in a communication network, the second node being a second end-point of signalling with a first node in the communication network, the first node being a first end-point in said signalling, the method comprising:
sending a message to the first node, the message comprising, in a header, a content format indication indicating that the message contains instructions for the first node to perform a plurality of actions, wherein the instructions indicate in which order to perform the plurality of actions; and
receiving an acknowledgement signal from the first node when the first node has performed all of the plurality of actions, the acknowledgement signal comprising an acknowledgement that the plurality of actions have been performed.

14. A second node for a communication network and configured for being a second end-point of signalling with a first node in the communication network, the first node being a first end-point in said signalling, the second node comprising:
processor circuitry; and
a storage unit storing instructions executable by said processor circuitry, wherein the second node is operative to:
send a message to the first node, the message comprising, in a header, a content format indication indicating, that the message contains instructions for the first node to perform a plurality of actions, wherein the instructions indicate in which order to perform the plurality of actions; and
receive an acknowledgement signal from the first node when the first node has performed all of the plurality of the actions, acknowledgement signal comprising an acknowledgement that the plurality of actions have been performed.

15. A non-transitory computer readable storage medium that stores program code which, when run on processor circuitry of a first node in a communication network, the first node being a first end-point of signalling with a second node in the communication network, the second node being a second end-point in said signalling, cause the first node to perform operations comprising:
receiving a message from the second node, the message comprising, in a header, a content format indication indicating that the message contains instructions for the first node to perform a plurality of actions, wherein the instructions indicate in which order to perform the plurality of actions;
performing the plurality of actions in the order indicated; and
sending an acknowledgement signal, comprising an acknowledgement that the plurality of actions have been performed, to the second node, in response to performing the plurality of actions.

16. A non-transitory computer readable storage medium that stores program code which, when run on processor circuitry of a second node in a communication network, the second node being a second end-point of signalling with a first node in the communication network, the first node being a first end-point in said signalling, cause the second node to perform operations comprising:
sending a message to the first node, the message comprising, in a header, a content format indication indicating that the message contains instructions for the first node to perform a plurality of actions, wherein the instructions indicate in which order to perform the plurality of actions; and
receiving an acknowledgement signal from the first node when the first node has performed all of the plurality of actions, the acknowledgement signal comprising an acknowledgement that the plurality of actions have been performed.

* * * * *